US012352609B2

(12) United States Patent
Al-Huwaider et al.

(10) Patent No.: US 12,352,609 B2
(45) Date of Patent: Jul. 8, 2025

(54) FLUID FLOW VELOCITY MEASUREMENT VIA THERMAL CONDUCTION

(71) Applicant: Saudi Arabian Oil Company, Dhahran (SA)

(72) Inventors: Mustafa A. Al-Huwaider, Dhahran (SA); Shouxiang Mark Ma, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 287 days.

(21) Appl. No.: 18/076,852

(22) Filed: Dec. 7, 2022

(65) Prior Publication Data

US 2024/0192038 A1 Jun. 13, 2024

(51) Int. Cl.
*G01F 1/68* (2006.01)
*G01F 1/684* (2006.01)
(Continued)

(52) U.S. Cl.
CPC ............ *G01F 1/6847* (2013.01); *G01F 1/696* (2013.01)

(58) Field of Classification Search
CPC . G01F 1/667; G01F 1/662; G01F 1/66; G01F 1/684; G01F 1/74; G01F 1/6845; G01F 1/696; G01F 25/10; G01F 1/692; G01F 1/6842; G01F 1/002; G01F 1/6847; G01F 1/663; G01F 1/698; G01F 5/00; G01F 1/58; G01F 1/712; G01F 15/005; G01F 1/28; G01F 1/68; G01F 1/668; G01F 1/688; G01F 15/024; G01F 1/6888; G01F 15/00;
(Continued)

(56) References Cited

U.S. PATENT DOCUMENTS 4,754,839 A 7/1988 Rathman
4,982,383 A 1/1991 Sims
(Continued)

FOREIGN PATENT DOCUMENTS

CN 103282602 A * 9/2013 ........... E21B 47/065
CN 117546013 A * 2/2024 ........... G01F 1/6845
(Continued)

OTHER PUBLICATIONS

Ma et al., "Cased-hole reservoir saturation monitoring in mixed-salinity environments—A new integrated approach," SPE 92426 presented at the 14th SPE Middle East Oil & Gas Show and Conference, Bahrain, Mar. 2005, 11 pages.
(Continued)

*Primary Examiner* — Andre J Allen
(74) *Attorney, Agent, or Firm* — Fish & Richardson P.C.

(57) ABSTRACT

A fluid velocity sensor can include a thermally conductive body comprising a first temperature sensor, a second temperature sensor, and a third temperature sensor. A heating element is secured within the fluid velocity sensor to heat the thermally conductive body. The first temperature sensor, the second temperature sensor, and the third temperature sensor each reside within the thermally conductive body at different radial distances from the heating element. A flowrate of a fluid in contact with the fluid velocity sensor is determined based on a comparison between the internal temperatures measured by each of the first, second, and third temperature sensors.

15 Claims, 11 Drawing Sheets

(51) Int. Cl.
*G01F 1/69* (2006.01)
*G01F 1/696* (2006.01)

(58) Field of Classification Search
CPC .......... G01F 1/7082; G01F 15/14; G01F 1/36;
G01F 1/661; G01F 1/666; G01F 1/34;
G01F 1/44; G01F 1/46; G01F 1/708;
G01F 1/00; G01F 1/8436; G01F 1/64;
G01F 15/063; G01F 1/7084; G01F
1/6884; G01F 15/02; G01F 1/72; G01F
1/86; G01F 1/50; G01F 1/69; G01F
1/7086; G01F 15/18; G01F 15/066; G01F
15/12; G01F 1/3209; G01F 1/6986; G01F
1/38; G01F 1/56; G01F 22/02; G01F
1/84; G01F 1/383; G01F 23/284; G01F
5/005; G01F 1/20; G01F 1/8418; G01F
1/88; G01F 1/10; G01F 1/32; G01F
1/6965; G01F 1/78; G01F 15/185; G01F
23/2962; G01F 1/40; G01F 1/7044; G01F
15/022; G01F 1/3218; G01F 1/8472;
G01F 1/8477; G01F 1/075; G01F 1/3259;
G01F 1/588; G01F 1/60; G01F 11/265;
G01F 11/267; G01F 15/0755; G01F 1/06;
G01F 1/3266; G01F 1/3287; G01F
1/8431; G01F 15/006; G01F 15/061;
G01F 23/296; G01F 1/206; G01F 1/699;
G01F 22/00; G01F 23/292; G01F 1/005;
G01F 1/115; G01F 1/3282; G01F 1/584;
G01F 1/7046; G01F 1/8409; G01F
1/8413; G01F 15/007; G01F 15/06; G01F
15/075; G01F 1/24; G01F 1/325; G01F
1/363; G01F 1/704; G01F 1/8427; G01F
23/04; G01F 23/14; G01F 23/2925; G01F
23/2927; G01F 23/30; G01F 23/76; G01F
1/103; G01F 1/203; G01F 1/37; G01F
1/849; G01F 15/003; G01F 15/10; G01F
23/247; G01F 23/2961; G01F 25/00;
G01F 25/20; G01F 1/065; G01F 1/12;
G01F 1/26; G01F 1/586; G01F 1/8404;
G01F 1/8422; G01F 15/046; G01F
23/2965; G01F 23/68; G01F 1/05; G01F
1/3227; G01F 1/8463; G01F 1/90; G01F
15/068; G01F 15/08; G01F 23/00; G01F
23/22; G01F 23/248; G01F 23/62; G01F
23/804; G01F 3/04; G01F 3/16; G01F
7/00; G01F 1/42; G01F 1/48; G01F
1/582; G01F 1/6886; G01F 1/8459; G01F
1/8468; G01F 15/04; G01F 15/043; G01F
15/07; G01F 15/125; G01F 23/168; G01F
23/18; G01F 23/24; G01F 23/245; G01F
23/263; G01F 23/2968; G01F 23/44;
G01F 23/72; G01F 23/80; G01F 3/20
See application file for complete search history.

(56) References Cited

U.S. PATENT DOCUMENTS

| | | | |
|---|---|---|---|
| 5,497,321 A | 3/1996 | Ramakrishnan et al. | |
| 5,965,813 A * | 10/1999 | Wan | G01F 1/699 |
| | | | 73/204.26 |
| 6,061,634 A | 5/2000 | Belani et al. | |
| 6,176,129 B1 | 1/2001 | Aguesse et al. | |
| 6,227,045 B1 | 5/2001 | Morse et al. | |
| 6,745,835 B2 | 6/2004 | Fields | |
| 8,265,874 B2 | 9/2012 | Ma et al. | |
| 8,423,304 B2 * | 4/2013 | Pfau | G01F 1/69 |
| | | | 702/47 |
| 10,208,582 B2 | 2/2019 | Ma et al. | |
| 10,247,849 B2 | 4/2019 | Pfutzner et al. | |
| 10,288,463 B2 | 5/2019 | DiFoggio | |
| 10,393,919 B2 * | 8/2019 | Adil | E21B 47/07 |
| 11,066,925 B2 | 7/2021 | Ligneul et al. | |
| 11,073,415 B2 * | 7/2021 | Udrea | G01N 27/14 |
| 2003/0010135 A1 | 1/2003 | Maxit et al. | |
| 2006/0214098 A1 * | 9/2006 | Ramos | G01F 1/6884 |
| | | | 374/E11.015 |
| 2008/0210420 A1 | 9/2008 | Ramakrishnan et al. | |
| 2015/0275661 A1 | 10/2015 | Donzier et al. | |
| 2016/0097273 A1 * | 4/2016 | Xia | E21B 47/103 |
| | | | 73/152.33 |
| 2018/0066501 A1 | 3/2018 | Chidiac et al. | |
| 2020/0208509 A1 | 7/2020 | Chen et al. | |
| 2020/0355073 A1 | 11/2020 | Maity et al. | |
| 2022/0282618 A1 | 9/2022 | Al-Huwaider et al. | |
| 2024/0157051 A1 * | 5/2024 | Rosser | G01F 25/15 |

FOREIGN PATENT DOCUMENTS

| | | | | |
|---|---|---|---|---|
| CN | 117597580 A * | 2/2024 | .......... | G01F 1/6888 |
| EP | 0733780 | 9/1996 | | |
| EP | 0866213 | 9/1998 | | |
| EP | 4202380 A1 * | 6/2023 | .......... | G01F 1/6884 |
| WO | WO 2007148269 | 12/2007 | | |

OTHER PUBLICATIONS

Ma et al., "Dynamic petrophysics—applications of time-lapse reservoir monitoring in Saudi Arabia," SPE 95882, presented at the 2005 SPE Annual Technical Conference and Exhibition, Dallas, Texas, Oct. 2005, 7 pages.

Ma et al., "Resolving the mixed salinity challenges with a methodology developed from pulsed neutron capture gamma ray spectral measurements," SPE 170608, presented at the SPE Annual Technical Conference and Exhibition, Amsterdam, The Netherlands, Oct. 2014, 12 pages.

Mountsopris.com [online], "Q140-FTC-Fluid Temperature + Conductivity," Aug. 2014, retrieved on May 27, 2022, retrieved from URL <https://mountsopris.com/q140-ftc-fluid-conductivity-and-temperature/>, 17 pages.

* cited by examiner

FLUID FLOW VELOCITY MEASUREMENT VIA THERMAL CONDUCTION

BACKGROUND

Production logging (PL) uses production logging tools (PLT) that can quantify production rates of reservoir fluids (oil, water, and gas) and to determine their production profiles along the wellbore penetrating the reservoir(s). A PLT can include a spinner or multiple spinners for fluid velocity determination, in addition to essential sensors such as temperature and pressure, caliper log, fluid hold-up measurements, gamma ray, and casing collar locator.

SUMMARY

The present disclosure describes techniques that can be used for performing fluid velocity estimation, for example, by thermal conduction, in a downhole borehole or within a surface pipe. In some implementations, a computer-implemented method includes the following.

Aspects of the embodiments are directed to a fluid velocity sensor a thermally conductive body including a first temperature sensor and a second temperature sensor; and a heating element secured within the fluid velocity sensor to heat the thermally conductive body. The first temperature sensor resides within the thermally conductive body at a first radial distance from the heating element; and the second temperature sensor resides within the thermally conductive body at a second radial distance from the heating element, the first radial distance different from the second radial distance.

Some embodiments may also include a first data channel coupled to the first temperature sensor to communicate first internal temperature information from the first temperature sensor; and a second data channel coupled to the second temperature sensor to communicate second internal temperature information from the second temperature sensor, wherein a velocity of a fluid in contact with the fluid velocity sensor is determined based on a comparison between the first internal temperature and the second internal temperature.

Some embodiments can also include a third temperature sensor residing within the thermally conductive body; and a third data channel coupled to the third temperature sensor to communicate third internal temperature information from the third temperature sensor, wherein the velocity of the fluid in contact with the fluid velocity sensor is determined based on a comparison between the first internal temperature, the second internal temperature, and the third internal temperature.

In some embodiments, the third temperature sensor resides within the thermally conductive body at a third radial distance from the heating element, the third radial distance different from the first and second radial distances.

Some embodiments can also include a heating element temperature sensor to measure a temperature of the heating element; and a heating element temperature sensor channel to communicate a temperature of a surface of the heating element.

Some embodiments can also include a thermally insulative body physically coupled to the thermally conductive body, wherein the heating element temperature sensor resides within the thermally insulative body.

In some embodiments, the thermally conductive body includes a substantially hemi-spherical shape; and the thermally insulative body includes a substantially hemi-spherical shape. The physical coupling of the thermally conductive body with the thermally insulative body defines a substantially spherical shape of the fluid velocity sensor.

In some embodiments, the thermally conductive body includes copper or silver.

In some embodiments, an average temperature is calculated from the first temperature and the second temperature, and a velocity of a fluid is determined from the average temperature.

In some embodiments, the velocity of the fluid is determined based on a correlation of the average temperature and a known velocity of the fluid at a known temperature.

Aspects of the embodiments are directed to a method for determining velocity of a fluid in a borehole, or a pipe, by a fluid velocity sensor that includes a thermally conductive body, a heating element in contact with an internal surface of the conductive body, a first temperature sensor within the conductive body at a first radial distance from the heating element, and a second temperature sensor within the conductive body at a second distance from the heating element, the method including causing the heating element to heat the conductive body to a predetermined temperature; receiving a first internal temperature of a first interior portion of the conductive body from the first temperature sensor; receiving a second internal temperature of a second interior portion of the conductive body from the second temperature sensor; and determining a velocity of a fluid in the borehole based on a comparison of the first internal temperature and the second internal temperature.

In some embodiments, the fluid velocity sensor includes third temperature sensor within the conductive body at a third radial distance from the heating element, and the method also includes receiving a third internal temperature of a third interior portion of the conductive body from the third temperature sensor; and determining a velocity of a fluid in the borehole based on a comparison of the first internal temperature, the second internal temperature, and the third internal temperature.

In some embodiments, determining the velocity also includes determining an average internal temperature of the first internal temperature, the second internal temperature, and the third internal temperature.

In some embodiments, determining the velocity of the fluid includes correlating the first internal temperature, the second internal temperature, the third internal temperature, the average internal temperature, and a type of fluid in the borehole with known temperature distribution data and known velocity data for the fluid.

Some embodiments can also include moving the fluid velocity sensor to a second location in the borehole or a pipe and determining a velocity of the fluid in the borehole or a pipe based on a comparison of the first internal temperature and the second internal temperature at the second location.

Aspects of the embodiments are directed to a production log tool system that includes a cable encasing a data bus, the data bus including a first data channel, a second data channel, and a control channel; and a fluid velocity sensor residing at an end of the cable. The fluid velocity sensor can include a thermally conductive body including a first temperature sensor and a second temperature sensor; and a heating element secured within the fluid velocity sensor to heat the thermally conductive body, the heating element electrically connected to the control channel, the control channel to communicate control information to the heating element. The first temperature sensor resides within the thermally conductive body at a first radial distance from the heating element, the first temperature sensor electrically connected to the first data channel, and the second temperature sensor resides within the thermally conductive body at a second radial distance from the heating element, the first radial distance different from the second radial distance, the second temperature sensor electrically connected to the second data channel.

Some embodiments can also include a spinner flowmeter secured to the cable at a position along the cable away from the fluid velocity sensor.

In some embodiments, the fluid velocity sensor including a third temperature sensor residing within the thermally conductive body; and the cable including a third data channel coupled to the third temperature sensor to communicate third internal temperature information from the third temperature sensor.

In some embodiments, the third temperature sensor resides within the thermally conductive body at a third radial distance from the heating element, the third radial distance different from the first and second radial distances.

In some embodiments, an average temperature is calculated from the first temperature and the second temperature, and a velocity of a fluid is determined from the average temperature; The velocity of the fluid is determined based on a correlation of the average temperature and a known velocity of the fluid at a known temperature.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. The device described herein can be used to compliment or replace spinner flowmeters for down-hole fluid flow measurements. The structure of the device is resistant to the effects of so-called sticky materials flowing in the borehole. In addition, the apparatus described herein contains few moving parts, resulting in less maintenance and more reliable data over the lifetime of the device.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Like reference numbers and designations in the various drawings indicate like elements. Figures are not drawn to scale.

DETAILED DESCRIPTION

Figure 1:
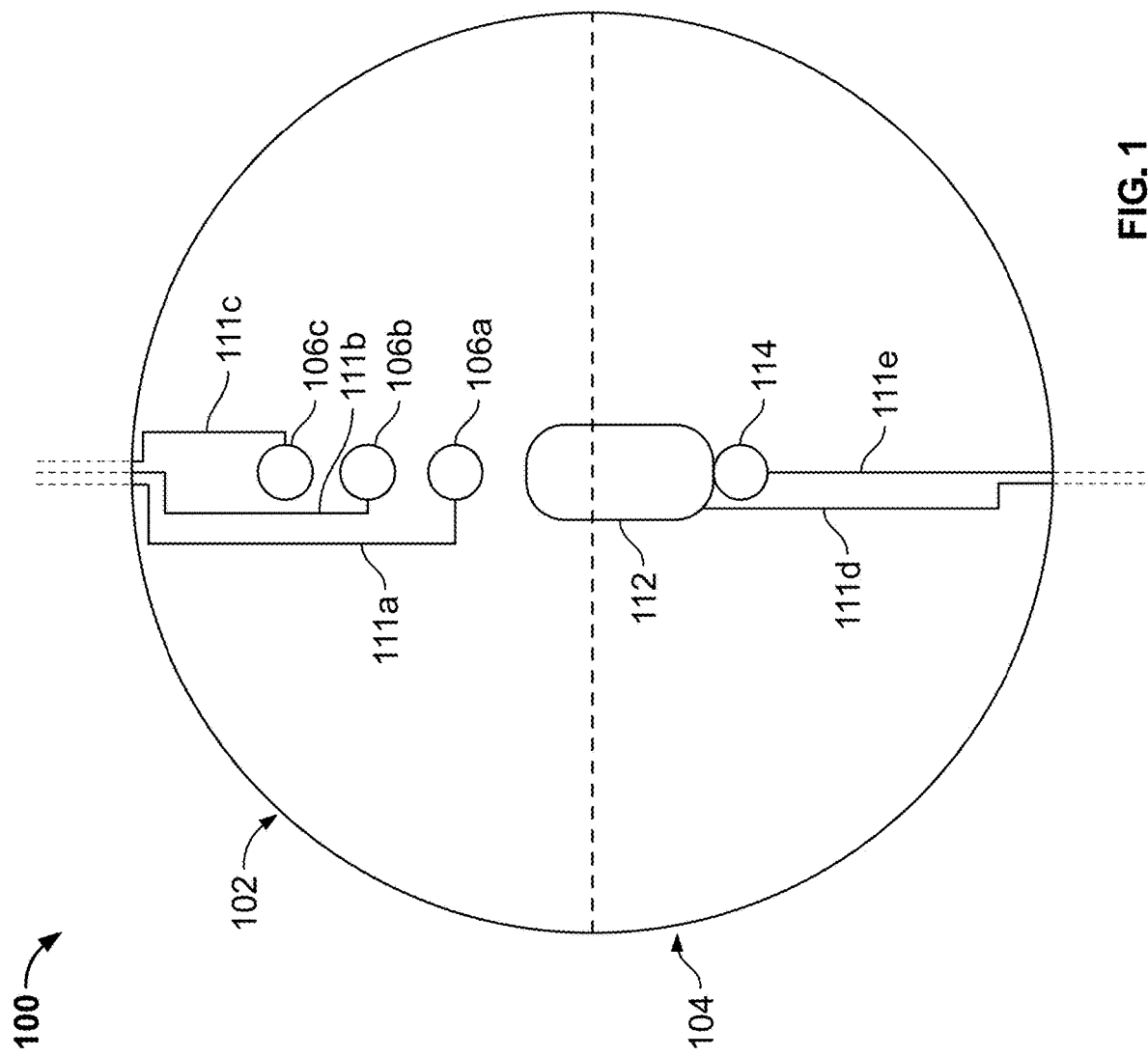
FIG. 1 is a schematic diagram of an example fluid velocity sensor in accordance with embodiments of the present disclosure.

The following detailed description describes a fluid velocity sensor apparatus, production log system, and methods for using the same to estimate flowrate of a fluid downhole. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

This disclosure is related to downhole or surface fluid velocity estimation via heat thermal conduction. Downhole production logging (PL) tools are used to quantify production rates of reservoir fluids (Oil, Water & Gas) and to determine their production profiles (layers contributions) along the wellbore penetrating the reservoir(s). A PL tool is mainly consist of a spinner or multiple spinners for fluid velocity determination, in addition to essential sensors such as temperature and pressure for reservoir fluid characterization, caliper log to convert fluid velocity to flow rate, fluid hold-up measurements (such as density, resistivity, and capacitance) to determine each individual fluid contribution to total flow, and Gamma ray and casing collar locator for depth correlation of the PLT measurements with original open-hole logs.

A PL is essential to monitor the performance of oil and gas producers, as well as water injectors, i.e., it is a routine operation to run PL tools in all producers and injectors. The process of conducting a PL is to do multiple (down and up) passes along the borehole at different cable velocities in ft/min vs spinner (such as CSF, continuous spinner flowmeter) readings in RPS (revolution per second) for calibration spinner readings to fluid velocity at reservoir in situ conditions of fluid viscosity and density.

The calibration process is tedious and prone to calibration parameter uncertainties such as the selections of slopes and intercepts (below figure) of the calibration curves. With an independent fluid velocity measurement as disclosed here, the spinner calibration uncertainties can be minimized and the multiple runs for spinner calibration can be reduced, saving operating time.

In addition, during PLT operation, some reservoir crude oils contain sticky materials that mainly consist of tar or wax like materials at wellbore temperature and pressure conditions, which is often mixed with sand, rocks and other downhole debris. These sticky materials contained in borehole fluid usually tend to stick on to the delicate spinners, which impair their sensitivity and performance. Sometimes, the sticky material stalls the spinner altogether making it impossible to measure any downhole fluid velocity and causes operational failures and downtimes. The issue is most common in horizontal wells where the tool is usually scrubbing/agitating the borehole floor deposits while moving during logging passes.

To overcome this challenge, instead of using the conventional spinner, a highly thermal conductive sphere with multiple internal temperature sensors and a heat source at its core can be used to estimate fluid velocity by measuring and mapping the temperature distribution and average temperature of the spherical probe. A more precise fluid flow profile can be obtained by integrating the thermal probe measurement with spinner measurement.

Figure 2:
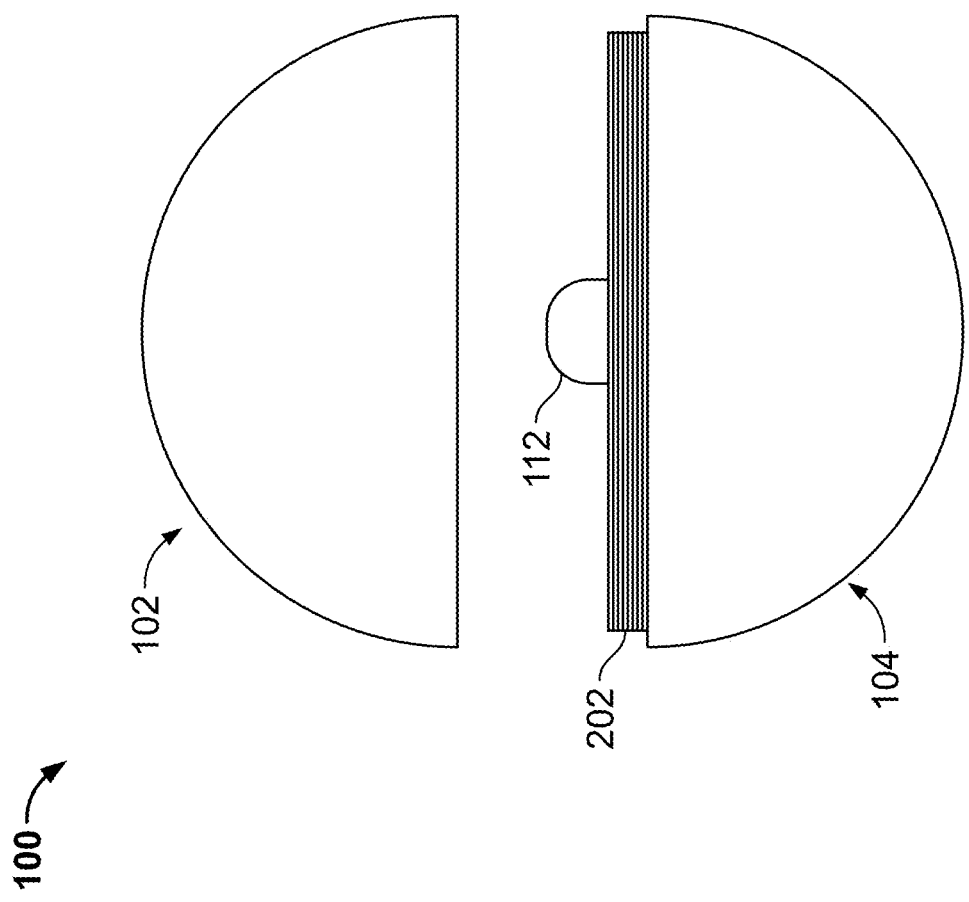
FIG. 2 is a schematic diagram of an example threaded configuration for coupling two hemispheres of the fluid velocity sensor in accordance with embodiments of the present disclosure.

FIG. 1 is a schematic diagram of an example fluid velocity sensor 100 in accordance with embodiments of the present disclosure. The fluid velocity sensor 100 can have a generally spherical shape to minimize resistance to fluid flow. The spherical shaped fluid velocity sensor 100 is divided into two hemi-spheres, a conductive portion 102 and an insulative portion 104. The conductive portion 102 can be made of a highly thermal conductive material, such as copper (398 W/m·K, watts per meter-kelvin) or silver (429 W/m/·K). The insulative portion 104 is made of a thermal insulator, such as glass fiber reinforced PolyEtherEtherKetone (PEEK, with thermal conductivity of 0.25 W/m·K). The conductive portion 102 and the insulative portion 104 can be coupled together by many ways. One example is shown in FIG. 2. FIG. 2 is a schematic diagram of the fluid velocity sensor 100 that uses a threaded interface 120 in accordance with embodiments of the present disclosure. In FIG. 2, the conductive portion 102 can be screwed onto the insulative portion 104 using threads 120. No electronics should be inside the hemisphere. Only temperature sensors and heating element. Please check the supplied figures for wiring. The electronics should be in the main PL tool module for all inputs away from the heat.

A heating element 112 is positioned at or near the core of the fluid velocity sensor 100 at a known position. The heating element 112 can raise the temperature of the conductive portion 102 to a level above the fluid within the borehole. The higher the difference in temperature between flowing fluids and the heating element inside the probe, the higher the sensitivity.

Temperature sensors, such as temperature sensors 106a, 106b, 106c, can be positioned within the conductive portion 102. In embodiments, each temperature sensor can be spaced at equal or substantially equal radial positions in the conductive portion 102. For example, a first temperature sensor 106a can be spaced at a first position on a radius outward from the heating element 112, the first position being proximate the heating element 112. A second temperature sensor 106b can be spaced at a second radial position outward from the heating element 112 and the first temperature sensor, proximate the first temperature sensor 106a. A third temperature sensor 106c can be spaced at a third radial position outward from the heating element 112, first temperature sensor 106a, and the second temperature sensor 106b, the third temperature sensor proximate the second temperature sensor 106b. More temperature sensors can also be positioned in the conductive portion at other locations. For example, temperature sensors can be positioned at other angular directions on a radius away from the heating element 112. A fourth temperature sensor 114 can be positioned proximate or contacting the heating element in, for example, the insulative portion 104. The temperature sensor 114 proximate the heating element 112 can precisely measure the heating element temperature without any impact from the surroundings.

Heat is transferred in fluids via convection. However, heat is transferred inside the fluid velocity sensor 100 by conduction. The higher the fluid's velocity in contact with the fluid velocity sensor 100, the higher the heat transfer, as the conductive portion 102 would lose heat much faster than low velocity fluid, until the conductive portion 102 (or the fluid velocity sensor 100, generally) reaches thermal equilibrium. Therefore, the temperature distribution inside the fluid velocity sensor 100 at high velocity is different than the temperature distribution at low velocity. By measuring the temperature distribution and the average temperature from each temperature sensor 106a, 106b, and 106c, the fluid velocity can be estimated. In addition, knowledge of fluid characteristics can be used to improve the accuracy of the prediction. If the fluid type is known, for example, predictive charts or fluid holdup measurements can be used to correlate temperature data with fluid velocity. Predictive charts, for example, can be developed in laboratories by measuring the temperature distribution and average temperature of specific fluid velocity sensor size, number of temperature sensors, and sensors spacing and distribution at different flow regimes and fluid types.

FIG. 2 is a schematic diagram of an example threaded configuration for coupling two hemispheres of the fluid velocity sensor in accordance with embodiments of the present disclosure. In FIG. 2, the insulative portion 104 includes threads 202. Threads 202 can mate with receiving threads on an inner surface of the conductive portion 102. The mating of threads can secure the conductive portion 102 and the insulative portion 104 together. Other ways of securing the conductive portion 102 and the insulative portion 104 are within the scope of this disclosure.

Figure 3:
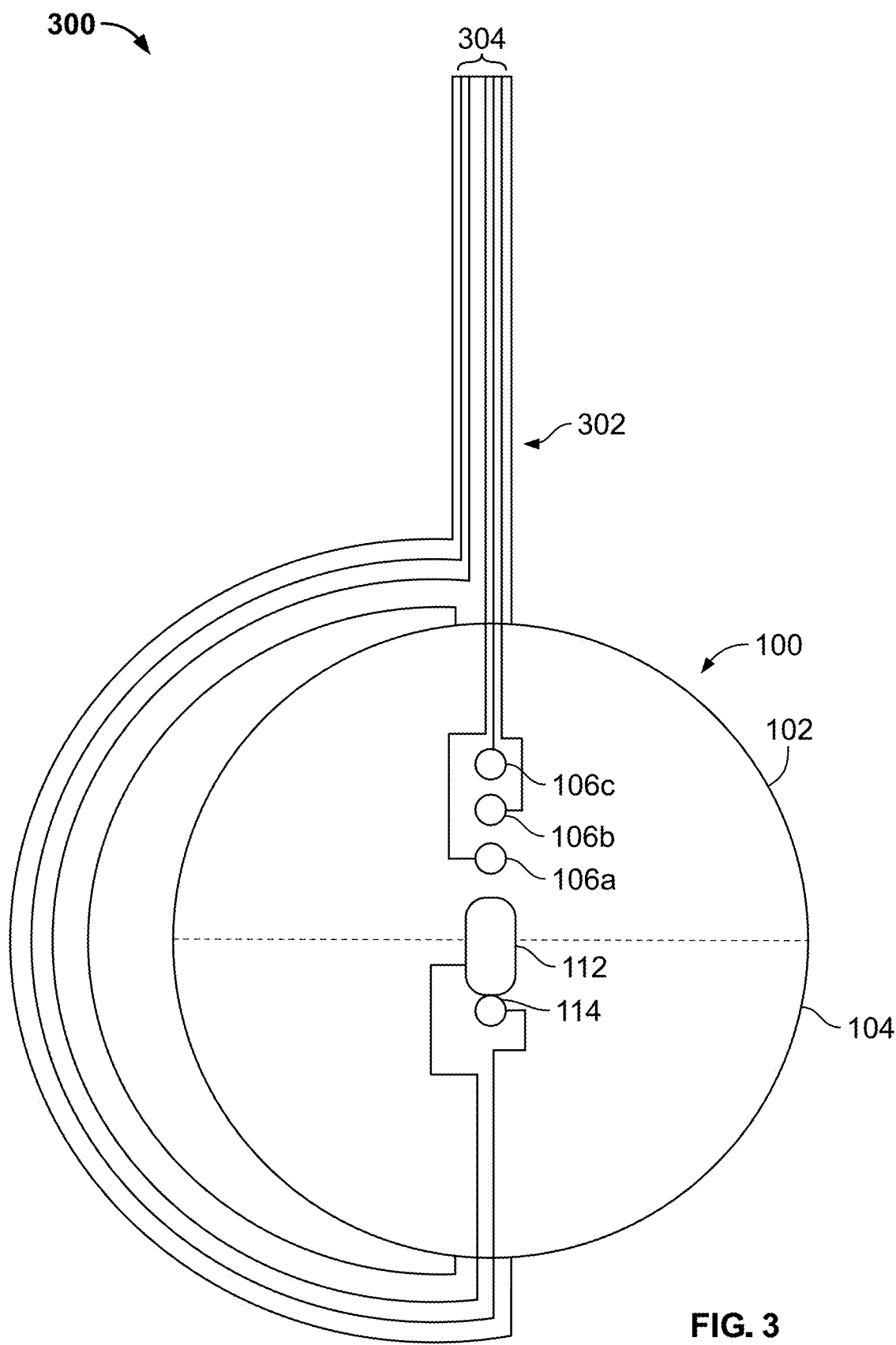
FIG. 3 is a schematic diagram of the fluid velocity sensor of FIG. 1 electrically connected to wiring through a cable in accordance with embodiments of the present disclosure.

FIG. 3 is a schematic diagram 300 of the fluid velocity sensor shown electrically coupled to a cable in accordance with embodiments of the present disclosure. FIG. 3 shows that wires 304 can extend from the surface to the fluid velocity sensor 100 through a protective cabling 302. The cabling can also provide downhole support for the fluid velocity sensor 100. Wires 304 can couple each temperature sensor 106a-c and 114, as well as the heating element 112 to a controller on the surface. A controller can control the heating element to turn on and off, and can set desired temperature for the heating element 112. The temperature of the heating element can be read back through temperature sensor 114 via wiring. During operation, temperatures from temperature sensors 106a, 106b, and 106c can be read via wiring, as well. Cable 302 can protect the wiring from damage, and can also provide insulation. Cable can also be used to suspend other devices and electrically connect other devices, as shown in FIGS. 4 and 6.

Figure 4:
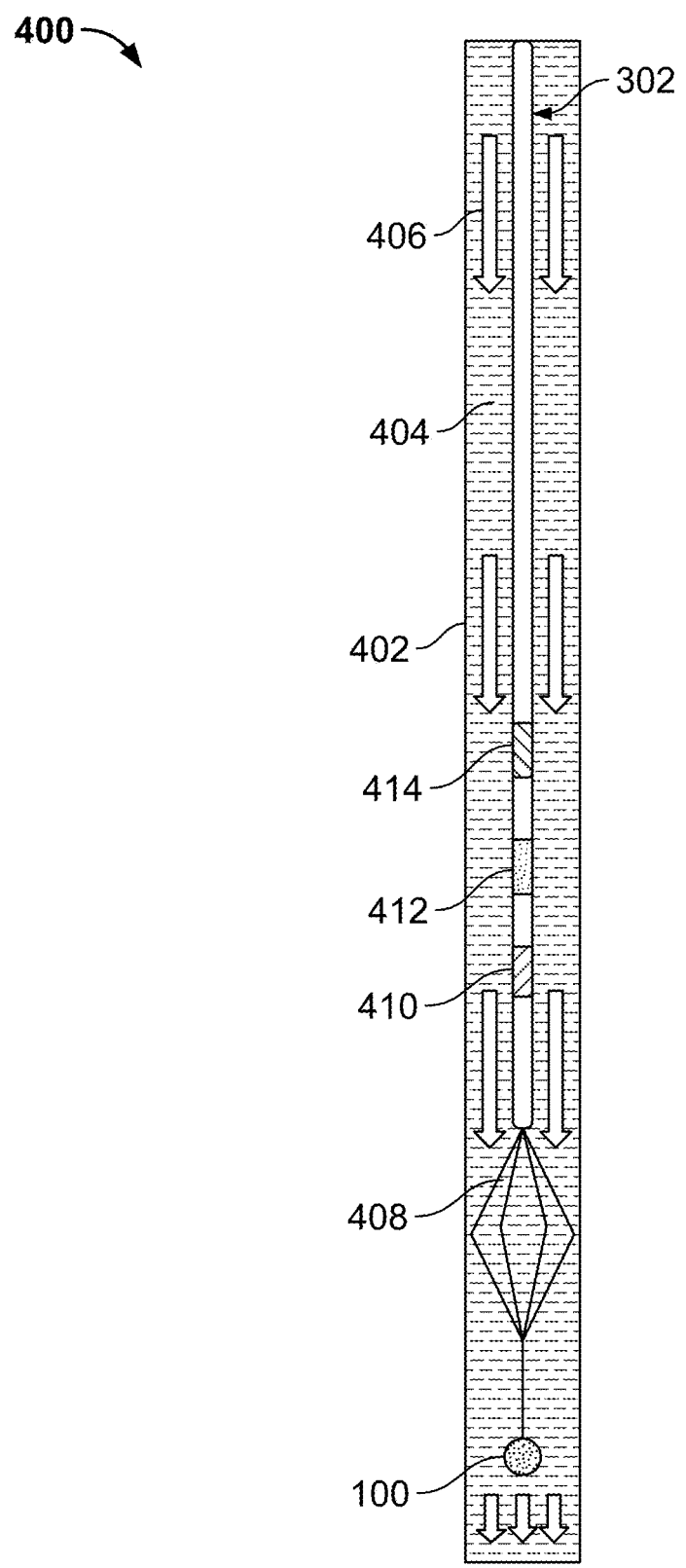
FIG. 4 is a schematic diagram of an example fluid velocity sensor with other downhole sensors within an injection well borehole in accordance with embodiments of the present disclosure.

FIG. 4 is a schematic diagram 400 of an example fluid velocity sensor 100 with other downhole sensors within an injection well borehole 402 in accordance with embodiments of the present disclosure. In this example, the fluid velocity sensor 100 is used in an injection well borehole 402 where injection borehole fluid 404 flows from the surface into an injection well, as shown by fluid flow direction 406. In addition, FIG. 4 shows the fluid velocity sensor 100 secured to a distal end of a cable or coiled tubing 302. Cable or coiled tubing 302 also includes a plurality of other sensors, such as a caliper 408, pressure probe 410, temperature probe 412, and density tool 414. Fluid typing can be determined by the density probe 414 or electrical fluid holdup probes 408 as part of the PL tool assembly. The flow rate of the fluid is calculated by multiplying the fluid velocity by the cross-sectional area of the borehole, which is measured by the caliper 408.

Figure 5A:
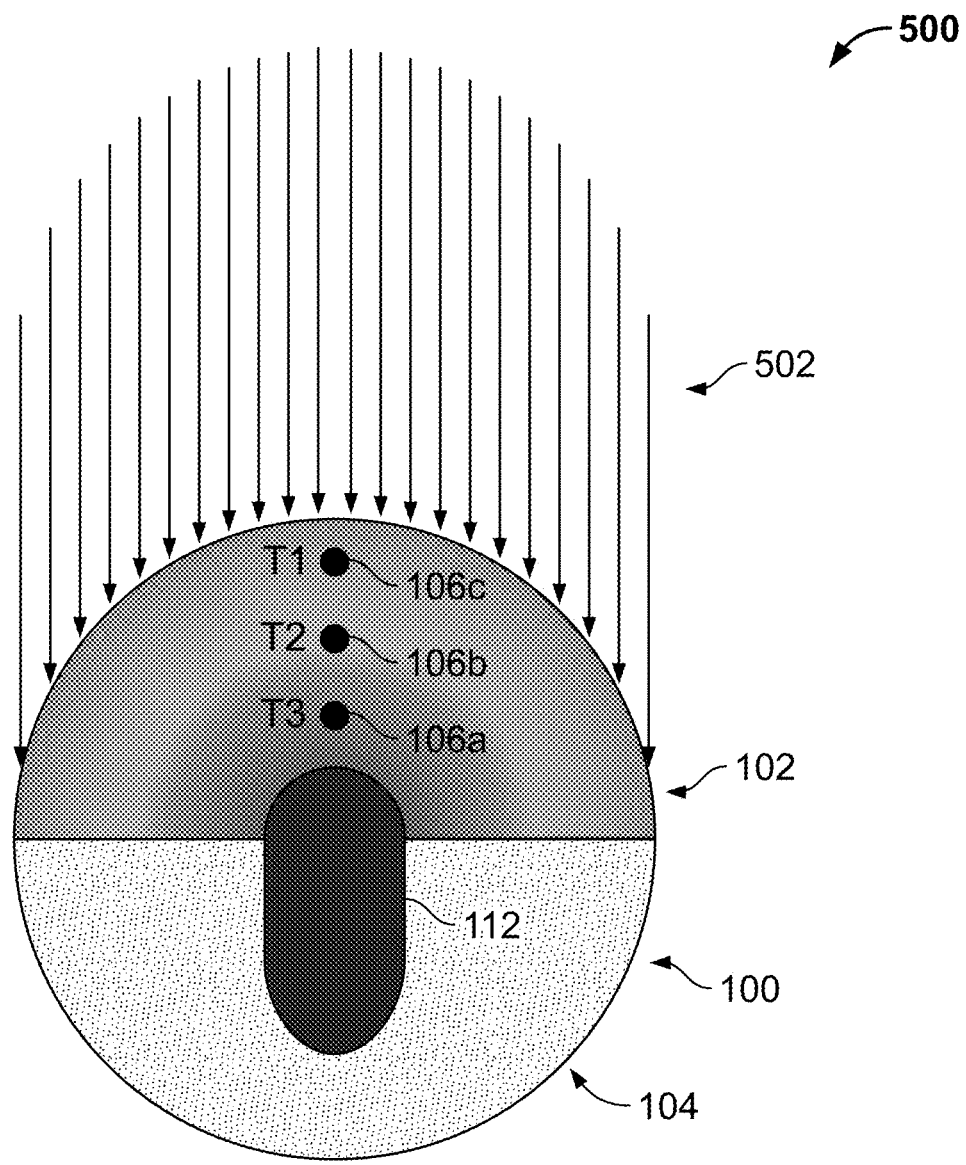
FIGS. 5A-B are schematic diagrams illustrating the fluid velocity sensor of FIG. 1 in an injection well under different flowrate conditions in accordance with embodiments of the present disclosure.
Figure 5B:
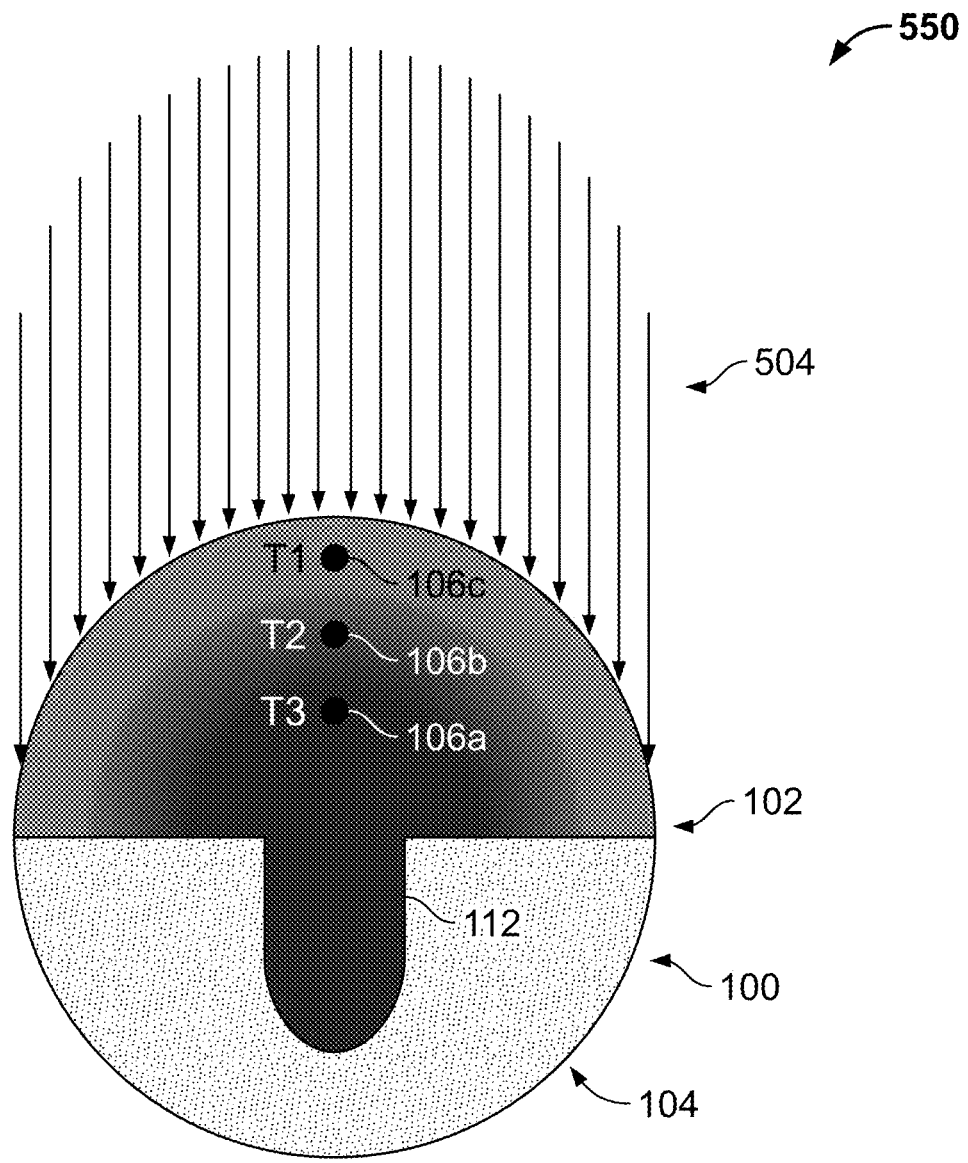

FIGS. 5A-B are schematic diagrams illustrating the fluid velocity sensor of FIG. 1 in an injection well borehole 402 under different flowrate conditions in accordance with embodiments of the present disclosure. First, because the flow of the fluid in the injection well is from the surface to the injection well, the orientation of the fluid velocity sensor 100 is for the conductive portion 102 to be in the flow of the fluid (i.e., facing upstream of the fluid flow). In FIG. 5A, the velocity of the fluid 502 is represented as relatively high in comparison to the velocity of the same fluid 504 in FIG. 5B. The change in temperature in the conductive portion 102 as measured by a comparison between the temperature sensors 106a-c is shown. The large difference in temperature between the temperature sensor 106c and the temperature sensor 106b and temperature sensor 106a indicates a high velocity because of the cooling effect the high velocity fluid has on the heated conductive portion 102. In FIG. 5B, the velocity of the fluid 504 is represented as relatively low in comparison to the velocity of the same fluid 502 in FIG. 5A. The change in temperature in the conductive portion 102 as measured by a comparison between the temperature sensors 106a-c is shown. The low velocity causes a reduction in the temperature of the conductive portion 102, but at a slower rate than if the velocity were higher. Thus, the temperature change in the conductive portion 102 is less than if the velocity were higher.

Figure 6:
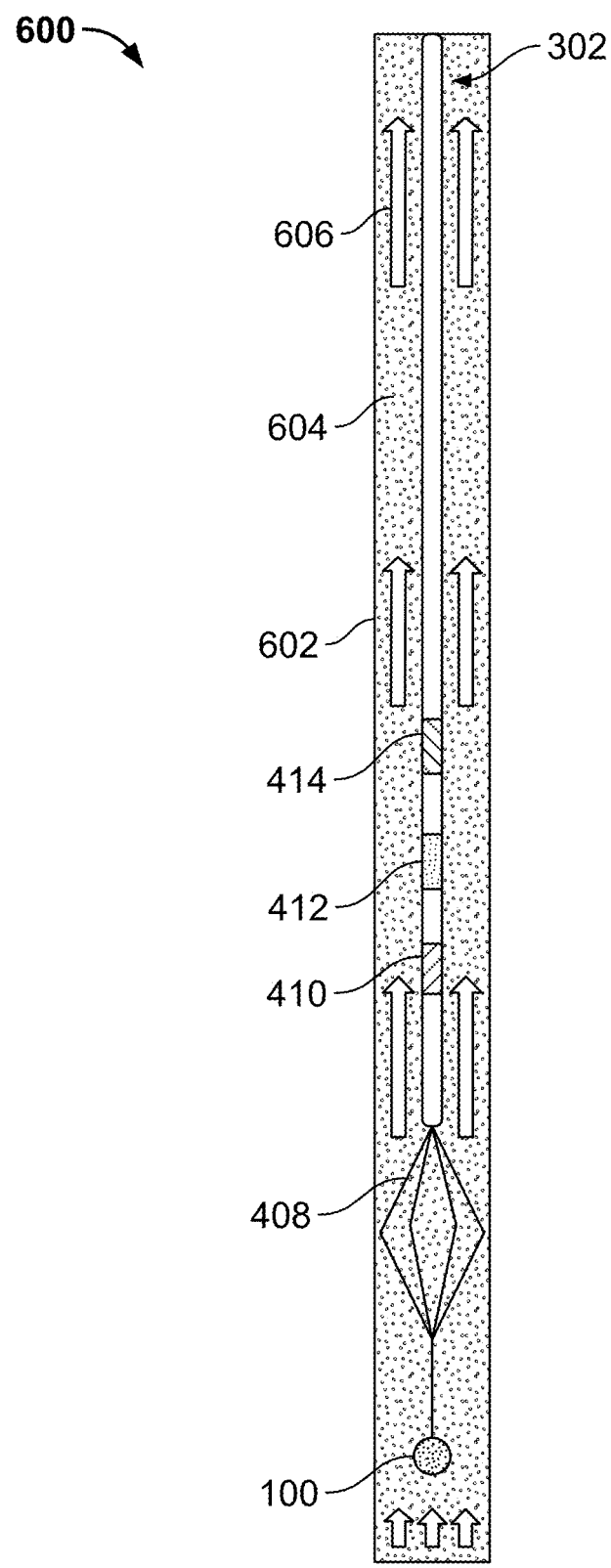
FIG. 6 is a schematic diagram of an example fluid velocity sensor with other downhole sensors within a production well borehole in accordance with embodiments of the present disclosure.
Figure 7:
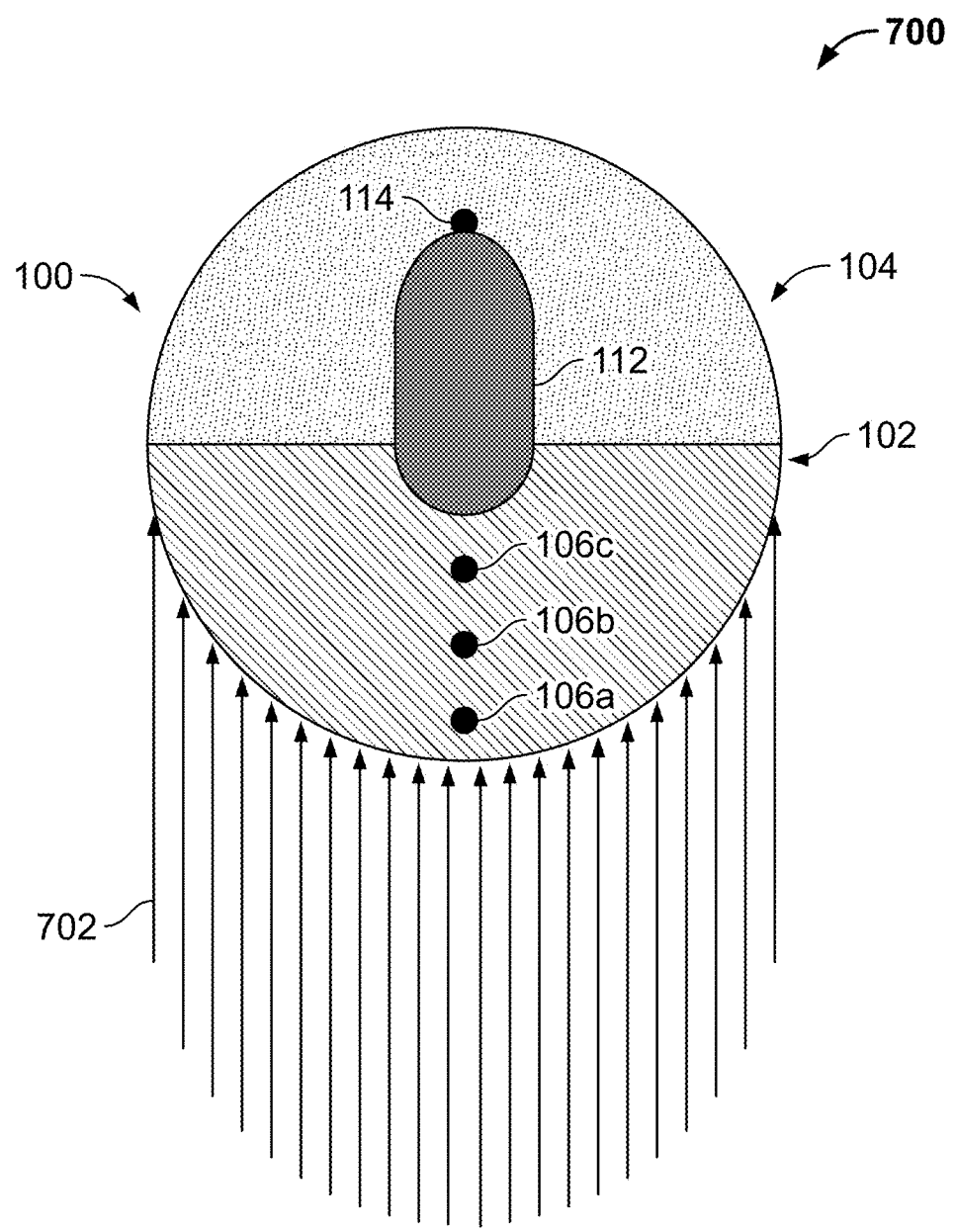
FIG. 7 is a schematic diagram illustrating the fluid velocity sensor of FIG. 1 in a production well under a flowrate condition in accordance with embodiments of the present disclosure.

FIG. 6 is a schematic diagram 600 of an example fluid velocity sensor 100 with other downhole sensors within a production well borehole 602 in accordance with embodiments of the present disclosure. FIG. 7 is a schematic diagram 700 illustrating the fluid velocity sensor 100 of FIG. 1 in a production well under a flowrate condition in accordance with embodiments of the present disclosure. The fluid velocity sensor 100 at the end of the cable 302 is shown with the conductive portion 102 facing upstream of the fluid flow direction 606. The cable 302 can hold the fluid velocity sensor 100, as well as other sensors, such as a caliper 408, a pressure probe 410, a temperature probe 412, and a density tool 414. Using the gravity of the tool and the cable or coiled tubing, the cable can be lowered into a production well borehole 602 to measure velocity and other characteristics of the borehole fluid 604. In this example, the borehole fluid 604 travels generally from a subterranean zone to a surface facility.

As shown in FIG. 7, the conductive portion 102 faces generally into the flow of the fluid 702 (which can be the same or similar as fluid 604). The flow of the production fluid 702 can cause a temperature change of the conductive portion 102. The flowrate of the production fluid 702 can be estimated based on a comparison of the temperature from the several temperature sensors in the conductive portion 102.

Figure 8:
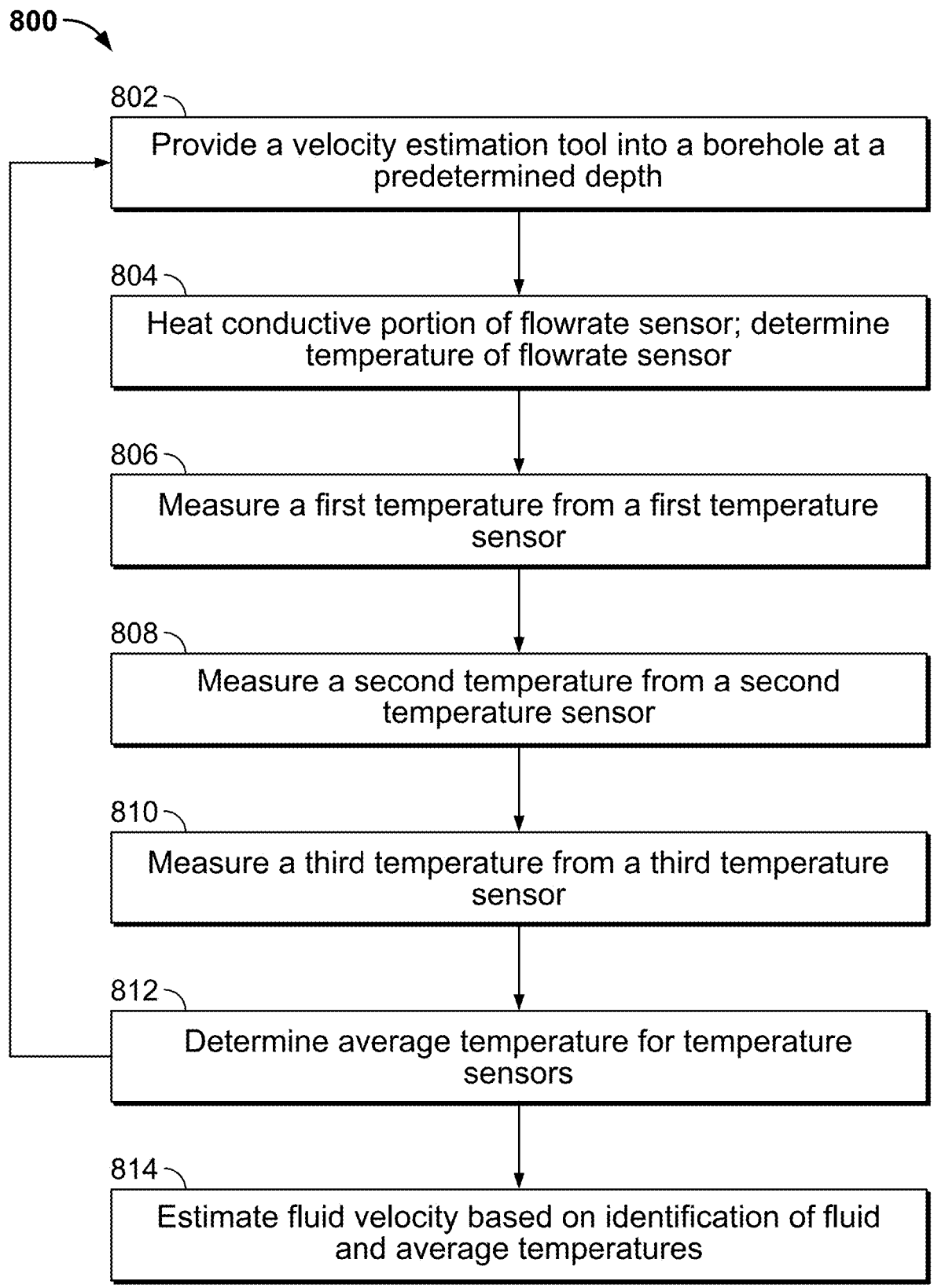
FIG. 8 is a process flow diagram for estimating the velocity of a fluid downhole in accordance with embodiments of the present disclosure.

FIG. 8 is a process flow diagram for estimating the velocity of a fluid downhole in accordance with embodiments of the present disclosure. For clarity of presentation, the description that follows generally describes method 800 in the context of the other figures in this description. However, it will be understood that method 800 can be performed, for example, by any suitable system, environment, software, and hardware, or a combination of systems, environments, software, and hardware, as appropriate. In some implementations, various steps of method 800 can be run in parallel, in combination, in loops, or in any order.

At 802, a fluid velocity sensor that includes two or more temperature sensors, a heating element, and a conductive portion, is provided into a borehole that transports a fluid. At 804, a conductive portion of the fluid velocity sensor is heated by a heating element encased or residing within the conductive portion. (The fluid velocity sensor can be heated prior to lowering it into the borehole.) The fluid in the borehole has a velocity and contacts the fluid velocity sensor with a certain velocity. As the fluid flows and contacts the fluid velocity sensor, the temperature of the conductive portion can change due to the heat transfer (i.e., conduction) from the conductive portion to the fluid.

At 806, a first temperature measurement can be taken from a first temperature sensors within the conduction portion of the fluid velocity sensor. At 808, a second temperature measurement can be taken from a second temperature sensors within the conduction portion of the fluid velocity sensor. At 810, a third temperature measurement can be taken from a third temperature sensors within the conduction portion of the fluid velocity sensor. For a fluid velocity sensor with more than three temperature sensors, more temperature readings can be taken.

From 806-810, method 800 proceeds to 812.

At 812, the measured temperature data is processed to extract flow rate sensitive parameters such as changes in temperature from one sensor to another, or average temperature. As an example, an average temperature is calculated from the first, second, and third temperatures (or fewer or more temperatures). At 814, the difference between the temperature in the conductive portion from the surface towards the heating element can be used to determine an average temperature, from which the velocity of the fluid in the borehole can be determined, especially when integrated with other measurements such as spinner and other fluid holdup sensors. For example, fluid characteristics (e.g., type of fluid, viscosity, heat transfer characteristics, etc.) can be predetermined. The change in temperature and the fluid characteristics can be used to determine the velocity of the fluid. The temperature measurements can be made several times at a single location to collect data. The fluid velocity sensor can also be repositioned within the borehole to get improved sensor measurements or to get velocity data at other locations within the borehole.

After 814, method 800 can stop.

Figure 9A:
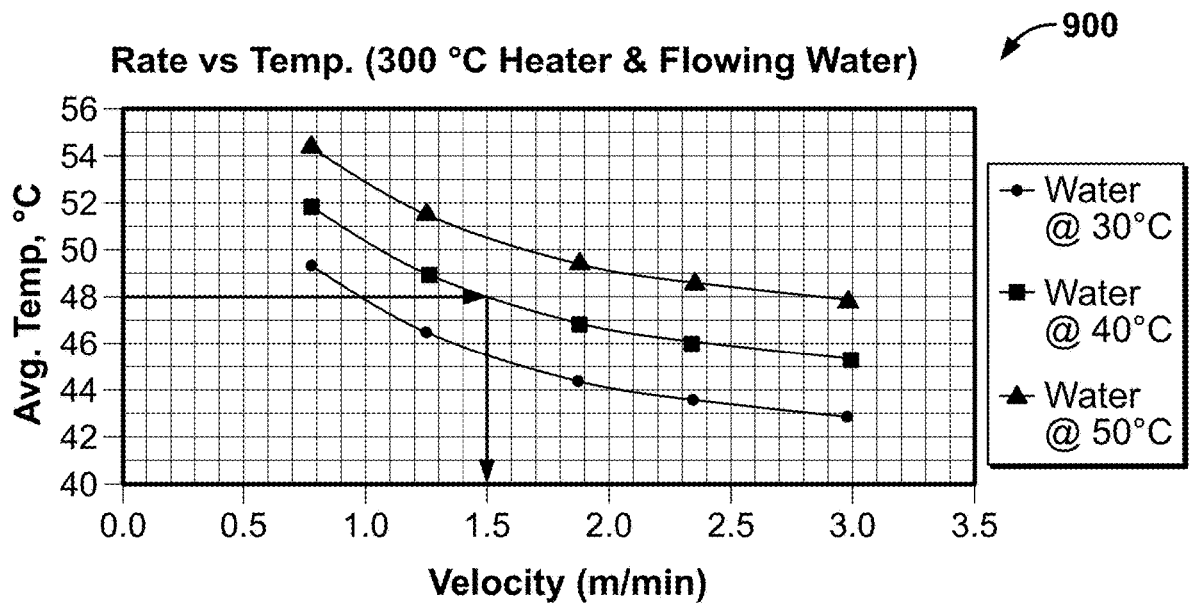
FIG. 9A is a graphical representation of a chart that shows an example of the relationship between velocity and average temperature in accordance with embodiments of the present disclosure.
Figure 9B:
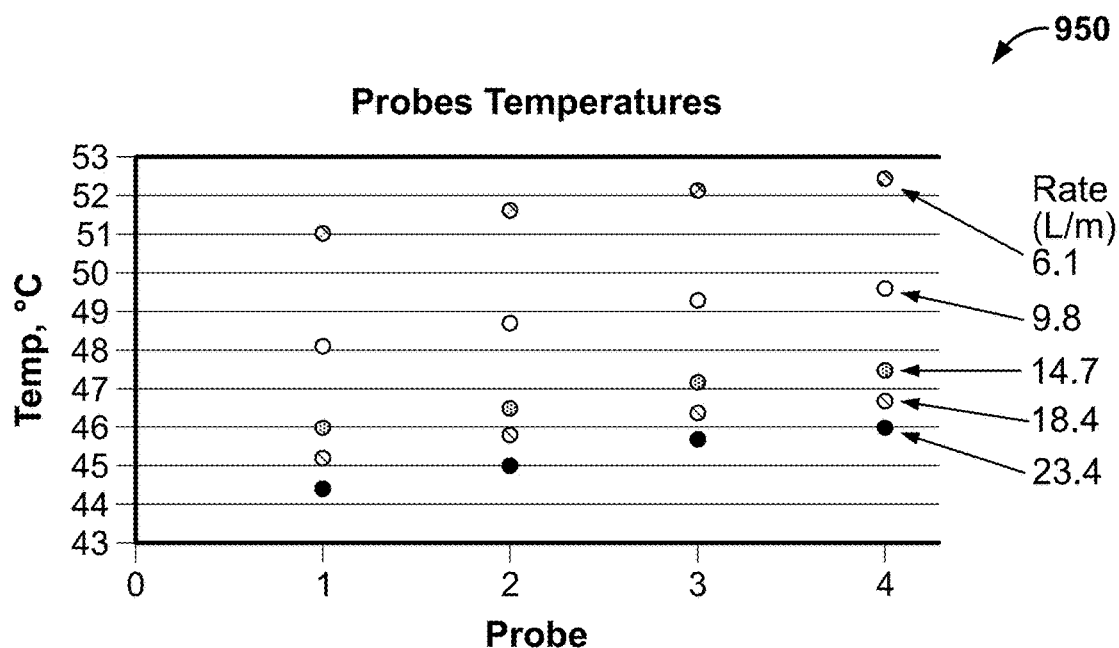
FIG. 9B is a graphical representation of a chart that shows an example of the temperature distribution inside a spherical probe at different fluids velocity in accordance with embodiments of the present disclosure.

FIG. 9A is a graphical representation of a chart 900 that shows an example of the relationship between average temperature and fluid velocity. FIG. 9B is a graphical representation of a chart 950 that shows an example of the temperature distribution inside a spherical probe at different fluid velocities. The velocity of water at various temperatures is mapped. In one example highlighted in FIG. 9A, if the average temperature of the sensors inside the fluid velocity sensor (Tave=(T1+T2+T3)/3) is 48 degrees C. and the borehole fluid temperature is 40 degrees C., then the predicted fluid velocity is around 1.5 m/min. Fluid velocity of the same fluid is measured in the laboratory at different fluid temperatures. The average temperature is the average of the temperature sensors inside the fluid velocity sensor. This chart shown in FIG. 9A can be used to predict the fluid velocity downhole. The borehole fluid temperature is determined by a temperature probe, such as temperature probe 412 shown in FIG. 4. Flowrate is determined by multiplying fluid velocity by borehole area.

Figure 10:
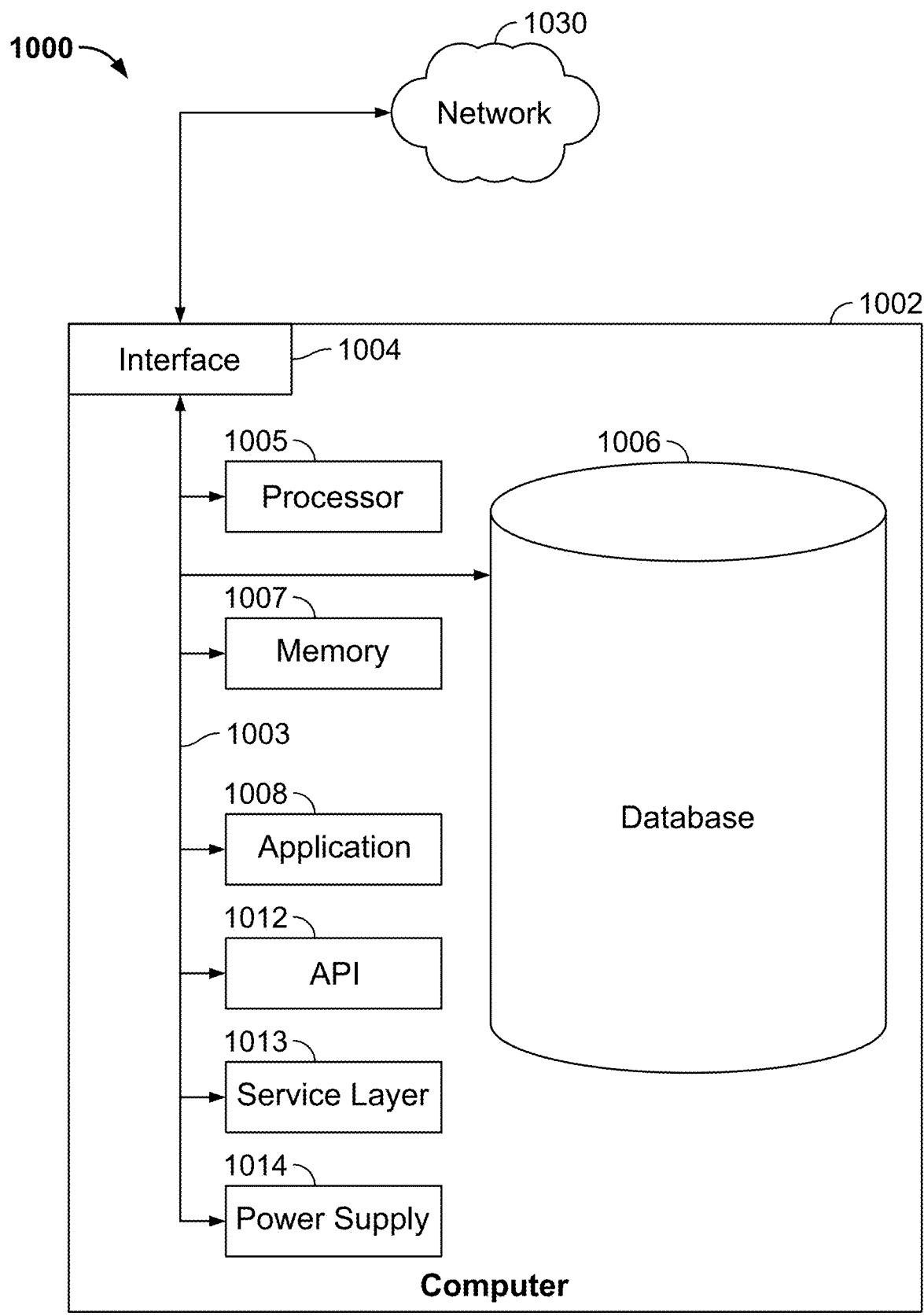
FIG. 10 is a block diagram illustrating an example computer system used to provide computational functionalities associated with described algorithms, methods, functions, processes, flows, and procedures as described in the present disclosure, according to some implementations of the present disclosure.

FIG. 10 is a block diagram of an example computer system 1000 used to provide computational functionalities associated with described algorithms, methods, functions, processes, flows, and procedures described in the present disclosure, according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a top level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both) over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases)

according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

The computer 1002 can reside at a surface facility on the surface of a well system. The computer 1002 can be coupled to the cable 201 and receive temperature information from the fluid velocity sensor 100. The computer 1002 can be used to send control information to the fluid velocity sensor 100, such as controlling the heating element 112 to activate or to control the internal temperature of the heating element 112. The computer 1002 can also receive temperature information from temperature sensors 106*a-c* and 114. The computer 1002 can process the temperature information to estimate the flowrate of the fluid in the borehole. For example, the computer 1002 can calculate average temperature in the conductive portion 102 (or the fluid velocity sensor 100 generally). The computer 1002 can map the temperature distribution and average temperature of the fluid velocity sensor 100. These measurements can be used to estimate flowrate velocity. These measurements can also be used to complement and calibrate spinner measurements, and reduce multiple PLT runs for traditional spinner calibration.

Described implementations of the subject matter can include one or more features, alone or in combination.

For example, in a first implementation, a computer-implemented method includes the following.

Example 1 is a fluid velocity sensor that includes a thermally conductive body including a first temperature sensor and a second temperature sensor; and a heating element secured within the fluid velocity sensor to heat the thermally conductive body; wherein the first temperature sensor resides within the thermally conductive body at a first radial distance from the heating element; and the second temperature sensor resides within the thermally conductive body at a second radial distance from the heating element, the first radial distance different from the second radial distance.

Example 2 may include the subject matter of example 1, and can also include a first data channel coupled to the first temperature sensor to communicate first internal temperature information from the first temperature sensor; and a second data channel coupled to the second temperature sensor to communicate second internal temperature information from the second temperature sensor, wherein a velocity of a fluid in contact with the fluid velocity sensor is determined based on a comparison between the first internal temperature and the second internal temperature.

Example 3 may include the subject matter of example 2, and can also include a third temperature sensor residing within the thermally conductive body; and a third data channel coupled to the third temperature sensor to communicate third internal temperature information from the third temperature sensor, wherein the velocity of the fluid in contact with the fluid velocity sensor is determined based on a comparison between the first internal temperature, the second internal temperature, and the third internal temperature.

Example 4 may include the subject matter of example 3, wherein the third temperature sensor resides within the thermally conductive body at a third radial distance from the heating element, the third radial distance different from the first and second radial distances.

Example 5 may include the subject matter of any of examples 1-4, and can also include a heating element temperature sensor to measure a temperature of the heating element; and a heating element temperature sensor channel to communicate a temperature of a surface of the heating element.

Example 6 may include the subject matter of example 5, and can also include a thermally insulative body physically coupled to the thermally conductive body, wherein the heating element temperature sensor resides within the thermally insulative body.

Example 7 may include the subject matter of example 6, wherein the thermally conductive body includes a substantially hemi-spherical shape; and the thermally insulative body includes a substantially hemi-spherical shape; wherein the physical coupling of the thermally conductive body with the thermally insulative body defines a substantially spherical shape of the fluid velocity sensor.

Example 8 may include the subject matter of any of examples 1-7, wherein the thermally conductive body includes copper or silver.

Example 9 may include the subject matter of any of examples 1-8, wherein an average temperature is calculated from the first temperature and the second temperature, and a velocity of a fluid is determined from the average temperature.

Example 10 may include the subject matter of example 9, wherein the velocity of the fluid is determined based on a correlation of the average temperature and a known velocity of the fluid at a known temperature.

Example 11 is a method for determining velocity of a fluid in a borehole or a pipe, by a fluid velocity sensor that includes a thermally conductive body, a heating element in contact with an internal surface of the conductive body, a first temperature sensor within the conductive body at a first radial distance from the heating element, and a second temperature sensor within the conductive body at a second distance from the heating element. The method can include causing the heating element to heat the conductive body to a predetermined temperature; receiving a first internal temperature of a first interior portion of the conductive body from the first temperature sensor; receiving a second internal temperature of a second interior portion of the conductive body from the second temperature sensor; and determining a velocity of a fluid in the borehole based on a comparison of the first internal temperature and the second internal temperature.

Example 12 may include the subject matter of example 11, wherein the fluid velocity sensor includes third temperature sensor within the conductive body at a third radial distance from the heating element, and the method also includes receiving a third internal temperature of a third interior portion of the conductive body from the third temperature sensor; and determining a velocity of a fluid in the borehole based on a comparison of the first internal temperature, the second internal temperature, and the third internal temperature.

Example 13 may include the subject matter of example 12, wherein determining the velocity further includes determining an average internal temperature of the first internal temperature, the second internal temperature, and the third internal temperature.

Example 14 may include the subject matter of example 13, wherein determining the velocity of the fluid includes correlating the first internal temperature, the second internal temperature, the third internal temperature, the average internal temperature, and a type of fluid in the borehole with known temperature distribution data and known velocity data for the fluid.

Example 15 may include the subject matter of any of examples 11-14, and can also include moving the fluid velocity sensor to a second location in the borehole or a pipe and determining a velocity of the fluid in the borehole or a pipe based on a comparison of the first internal temperature and the second internal temperature at the second location.

Example 16 is a production log tool system that includes a cable encasing a data bus, the data bus including a first data channel, a second data channel, and a control channel; and a fluid velocity sensor residing at an end of the cable, the fluid velocity sensor including a thermally conductive body including a first temperature sensor and a second temperature sensor; and a heating element secured within the fluid velocity sensor to heat the thermally conductive body, the heating element electrically connected to the control channel, the control channel to communicate control information to the heating element, wherein the first temperature sensor resides within the thermally conductive body at a first radial distance from the heating element, the first temperature sensor electrically connected to the first data channel, and the second temperature sensor resides within the thermally conductive body at a second radial distance from the heating element, the first radial distance different from the second radial distance, the second temperature sensor electrically connected to the second data channel.

Example 17 may include the subject matter of example 16, and can also include a spinner flowmeter secured to the cable at a position along the cable away from the fluid velocity sensor.

Example 18 may include the subject matter of any of examples 16-17, and wherein the fluid velocity sensor can include a third temperature sensor residing within the thermally conductive body; and the cable including a third data channel coupled to the third temperature sensor to communicate third internal temperature information from the third temperature sensor.

Example 19 may include the subject matter of example 18, wherein the third temperature sensor resides within the thermally conductive body at a third radial distance from the heating element, the third radial distance different from the first and second radial distances.

Example 20 may include the subject matter of any of examples 16-19, wherein an average temperature is calculated from the first temperature and the second temperature, and a velocity of a fluid is determined from the average temperature; and wherein the velocity of the fluid is determined based on a correlation of the average temperature and a known velocity of the fluid at a known temperature. In embodiments, the average temperature is calculated from the first temperature, the second temperature, and the third temperature. More temperature sensors can be used to further refine the average temperature calculations.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A fluid velocity sensor comprising:
a thermally conductive body comprising a first temperature sensor and a second temperature sensor; and
a heating element secured within the fluid velocity sensor to heat the thermally conductive body;
wherein:
the first temperature sensor resides within the thermally conductive body at a first radial distance from the heating element; and
the second temperature sensor resides within the thermally conductive body at a second radial distance from the heating element, the first radial distance different from the second radial distance.

2. The fluid velocity sensor of claim 1, further comprising:
a first data channel coupled to the first temperature sensor to communicate first internal temperature information from the first temperature sensor; and
a second data channel coupled to the second temperature sensor to communicate second internal temperature information from the second temperature sensor,
wherein a velocity of a fluid in contact with the fluid velocity sensor is determined based on a comparison between the first internal temperature and the second internal temperature.

3. The fluid velocity sensor of claim 2, further comprising:
a third temperature sensor residing within the thermally conductive body; and
a third data channel coupled to the third temperature sensor to communicate third internal temperature information from the third temperature sensor, wherein the velocity of the fluid in contact with the fluid velocity sensor is determined based on a comparison between the first internal temperature, the second internal temperature, and the third internal temperature.

4. The fluid velocity sensor of claim 3, wherein the third temperature sensor resides within the thermally conductive body at a third radial distance from the heating element, the third radial distance different from the first and second radial distances.

5. The fluid velocity sensor of claim 1, further comprising:
a heating element temperature sensor to measure a temperature of the heating element; and
a heating element temperature sensor channel to communicate a temperature of a surface of the heating element.

6. The fluid velocity sensor of claim 5, further comprising:
a thermally insulative body physically coupled to the thermally conductive body,
wherein the heating element temperature sensor resides within the thermally insulative body.

7. The fluid velocity sensor of claim 6, wherein:
the thermally conductive body comprises a substantially hemi-spherical shape; and
the thermally insulative body comprises a substantially hemi-spherical shape;
wherein the physical coupling of the thermally conductive body with the thermally insulative body defines a substantially spherical shape of the fluid velocity sensor.

8. The fluid velocity sensor of claim 1, wherein the thermally conductive body comprises copper or silver.

9. The fluid velocity sensor of claim 1, wherein an average temperature is calculated from the first temperature and the second temperature, and a velocity of a fluid is determined from the average temperature.

10. The fluid velocity sensor of claim 9, wherein the velocity of the fluid is determined based on a correlation of the average temperature and a known velocity of the fluid at a known temperature.

11. A method for determining velocity of a fluid in a borehole or a pipe, by a fluid velocity sensor that includes a thermally conductive body, a heating element in contact with an internal surface of the conductive body, a first temperature sensor within the conductive body at a first radial distance from the heating element, and a second temperature sensor within the conductive body at a second distance from the heating element, the method comprising:
causing the heating element to heat the conductive body to a predetermined temperature;
receiving a first internal temperature of a first interior portion of the conductive body from the first temperature sensor;
receiving a second internal temperature of a second interior portion of the conductive body from the second temperature sensor; and
determining a velocity of a fluid in the borehole based on a comparison of the first internal temperature and the second internal temperature.

12. The method of claim 11, wherein the fluid velocity sensor comprises third temperature sensor within the conductive body at a third radial distance from the heating element, and the method further comprises:
receiving a third internal temperature of a third interior portion of the conductive body from the third temperature sensor; and
determining a velocity of a fluid in the borehole based on a comparison of the first internal temperature, the second internal temperature, and the third internal temperature.

13. The method of claim 12, wherein determining the velocity further comprises determining an average internal temperature of the first internal temperature, the second internal temperature, and the third internal temperature.

14. The method of claim 13, wherein determining the velocity of the fluid comprises correlating the first internal temperature, the second internal temperature, the third internal temperature, the average internal temperature, and a type of fluid in the borehole with known temperature distribution data and known velocity data for the fluid.

15. The method of claim 11, further comprising moving the fluid velocity sensor to a second location in the borehole or a pipe and determining a velocity of the fluid in the borehole or a pipe based on a comparison of the first internal temperature and the second internal temperature at the second location.

* * * * *